United States Patent [19]

Michel et al.

[11] Patent Number: 4,852,755
[45] Date of Patent: Aug. 1, 1989

[54] COOKING VESSEL WITH EXPANSIBLE COVER

[76] Inventors: Robert C. Michel, 52 Sigrid Dr., Carnegie, Pa. 15106; Douglas D. Michel, 301 Beech St., Hackensack, N.J. 07601

[21] Appl. No.: 243,765
[22] Filed: Sep. 13, 1988
[51] Int. Cl.⁴ .............................................. B65D 6/00
[52] U.S. Cl. ................................ 220/4 D; 220/85 D; 206/547
[58] Field of Search ................. 220/4 D, 4 C, 8, 23.6, 220/85 D, 185 CH; 206/546, 547, 577

[56] References Cited

U.S. PATENT DOCUMENTS

| | | | |
|---|---|---|---|
| 490,902 | 1/1893 | Galbreath | 220/4 E |
| 2,326,414 | 8/1943 | Thompson | 220/4 D |
| 4,234,097 | 11/1980 | Daenen | 220/4 D |
| 4,326,640 | 9/1980 | Nitzberg et al. | 220/4 D |
| 4,474,303 | 10/1984 | Maccise | 220/4 D |
| 4,598,832 | 7/1986 | Alonso | 220/4 D |

*Primary Examiner*—Joseph Man-Fu Moy
*Attorney, Agent, or Firm*—W. Patrick Quast

[57] ABSTRACT

A cooking vessel includes a pan and a cover, and the cover having a lid and a shield assembly with a peripheral space therebetween. The shield assembly comprises an expansible shield member which is supported by the pan, and a plurality of clip members which support the lid and which are supported by the expansible shield member. The expansible shield member includes an overlapping peripherally spaced end portions for adjusting the diameter of the shield member.

6 Claims, 2 Drawing Sheets

COOKING VESSEL WITH EXPANSIBLE COVER

The invention generally relates to a cooking vessel with an expansible cover, and in particular the invention relates to a cooking vessel with an expansible cover having an expansible shield assembly.

BACKGROUND OF THE INVENTION

The prior art cooking vessel is described in U.S. Pat. No. 4,700,689, issued Oct. 20, 1987. Related patents include U.S. Pat. Nos.:
1,202,216, issued Oct. 24, 1916;
2,002,237 issued May 21, 1935; and,
4,590,919, issued May 27, 1986.

The prior art cooking vessel includes a pan and a cover, which has a fixed inner diameter.

One problem with the prior art cooking vessel is that the cover is not adjustable in diameter, so that the cover does not fit some pans of larger diameter or smaller diameter. Another problem is that the height of the enclosed cooking chamber is not adjustable for a given diameter cover.

SUMMARY OF THE INVENTION

According to the present invention, a cooking vessel is provided. This cooking vessel includes a pan and a cover, said cover having a lid and a shield assembly with a peripheral spaced therebetween, said shield assembly comprising an expansible shield member which is supported by the pan, and a plurality of clip members which support the lid and which are supported by the expansible shield member, said expansible shield member having overlapping peripherally spaced end portions for adjusting the diameter of the shield member. By using the expansible shield member and the plurality of clips, the problems of not being able to adjust the diameter of the cover and not being able to adjust the height of the enclosed chamber for a given diameter cover are avoided. The foregoing and other objects, features and advantages will be apparent from the following description of the preferred embodiment of the invention as illustrated in the accompanying drawings.

DESCRIPTION OF THE PREFERRED EMBODIMENT

Figure 1:
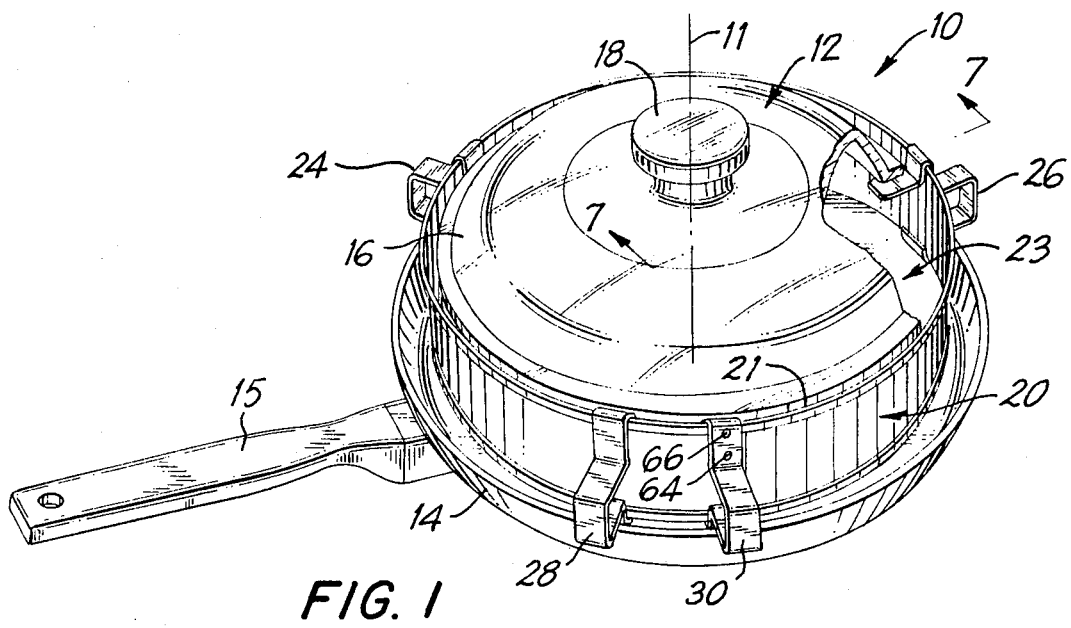
FIG. 1 is a perspective view of a cooking vessel according to the invention.

As shown in FIG. 1, a cooking vessel 10 is provided. Vessel 10, which has an axis 11, includes an expansible cover 12, and a frying pan 14 with a handle 15. COVER 12 includes a cover lid 16 with a knob 18, and a shield assembly 20 which has a peripheral vent opening or space 21 for its enclosed chamber 23.

Figure 2:
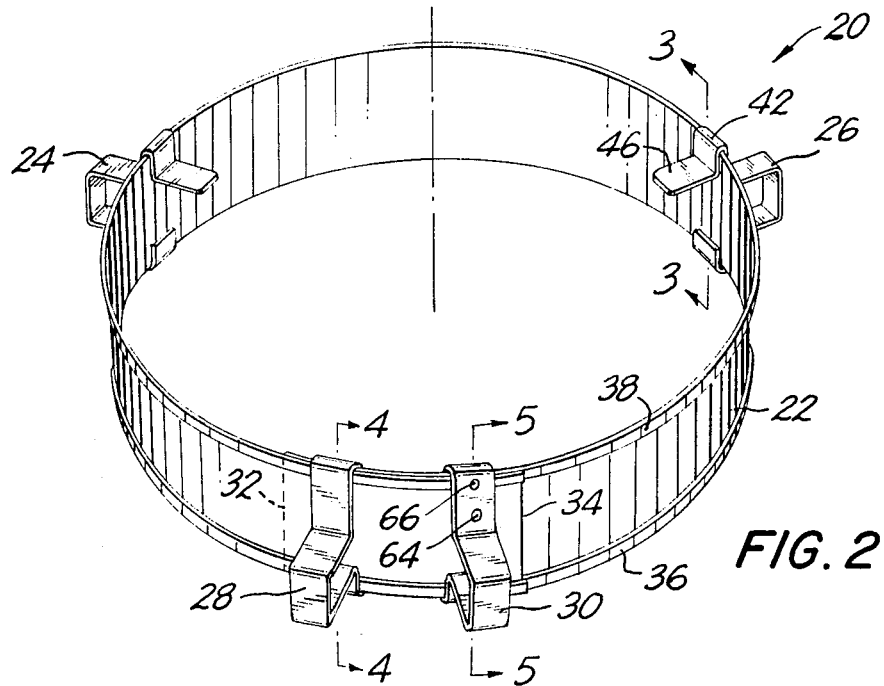
FIG. 2 is a perspective view of a portion of FIG. 1.

In FIGS. 1 and 2, shield assembly 20 includes a shield member 22, a first movable clip 24, a second movable clip 26, a first retainer clip 28, and a second retainer clip 30.

In FIG. 2, shield member 22 has an inner end portion 32 and an outer end portion 4. Shield member 22 also has a bottom return bend 36 and a top return bend 38.

Figures 3, 4, 5:
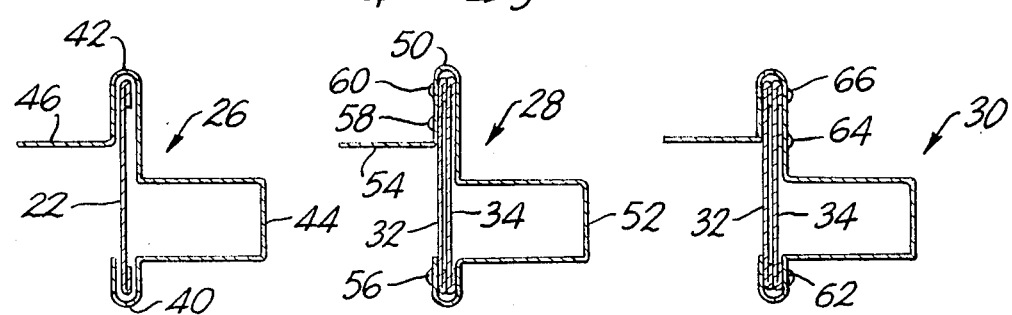
FIG. 3 is a section view as taken along the line 3—3 of FIG. 2.
FIG. 4 is a section view as taken along the lined 4—4 of FIG. 2.
FIG. 5 is a section view as taken along the line 5—5 of FIG. 2.
Figure 6:
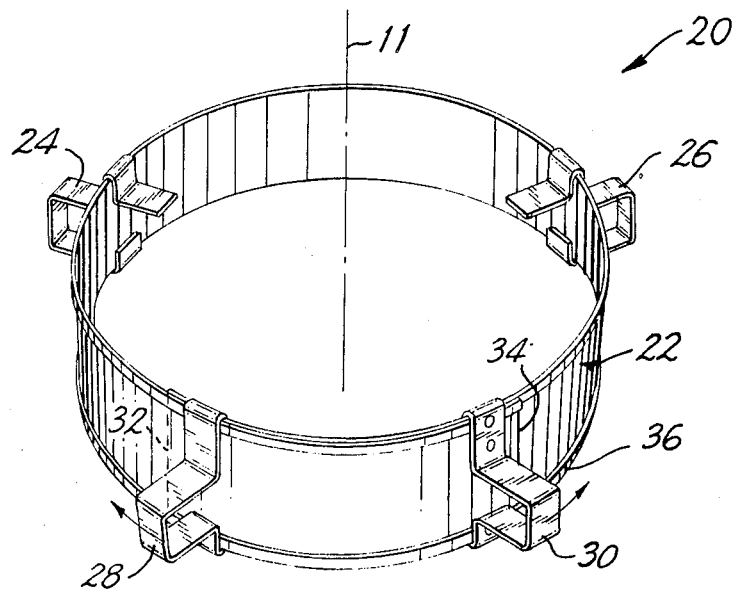
FIG. 6 is a perspective view of the portion shown in FIG. 2 after readjusting the diameter thereof.
Figure 8:
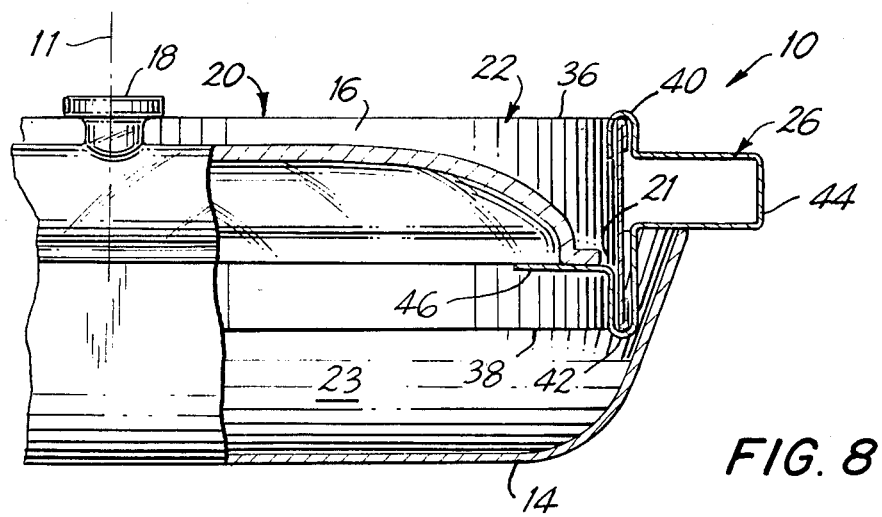
FIG. 8 is a section view corresponding to FIG. 7 after turning a portion thereof upside down.
Figure 7:
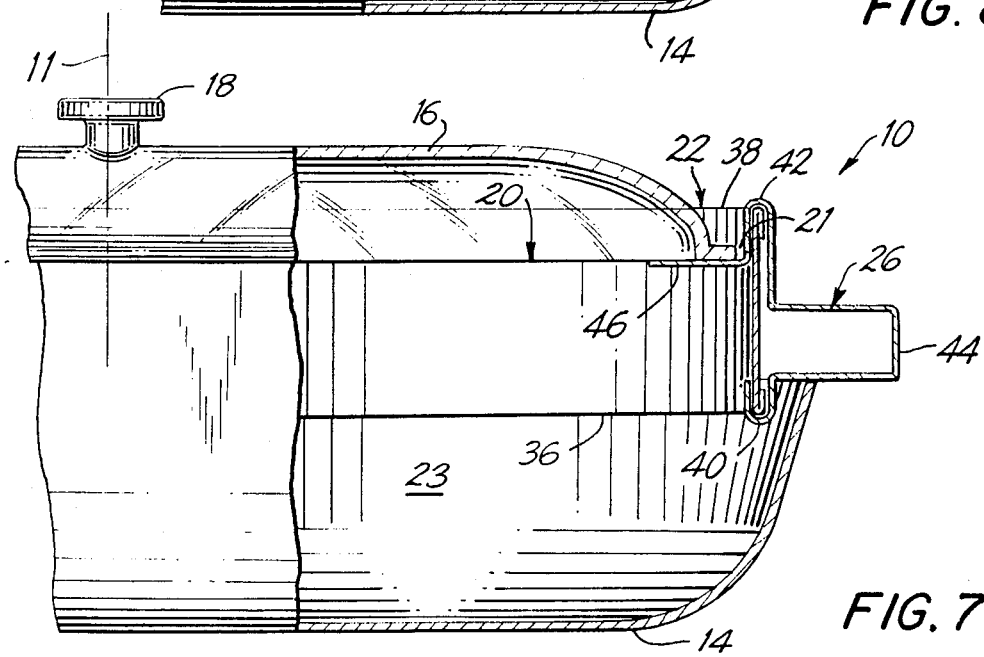
FIG. 7 is a section view as taken along the line 7—7 of FIG. 1.

In FIG. 3, second movable clip 26, which is identical in construction to first movable clip 24, has a lower loop portion 40, an upper loop portion 42, a U-shaped portion 44, and an inner flange 46; and U-shaped portion 44 is fixedly connected at each end thereof to respective lower loop portion 40 and upper loop portion 42.

Loop portion 40 has an inner radius of a size which is larger than the overall thickness of two overlapping return bends 36. Loop portion 42 has a similar inner radius which is larger than the overall thickness of two overlapping return bends 38. Each such radius is small enough to maintain a frictional contact of such overlapping return bends.

In FIGS. 4 and 5, first retainer clip 28 is identical in construction to second retainer clip 30 except for respective welds as explained hereafter. 1 First retainer clip 28 has a lower loop portion 48, an upper loop portion 50, a U-shaped portion 52, and an inner flange 54. Outer end portion 34 overlaps inner end portion 32.

In FIGS. 2, 4 and 5, inner end portion 32 has three inner welds 56, 58, 60, which connect inner end portion 32 to first retainer clip 28. 1 Outer lend portion 34 has three outer welds 62, 64, 66, which connect outer lend portion 34 to second retainer clip 30.

In a preferred embodiment of vessel 10, the shield member 22, when fully extended, is about 11.50 inches, and when fully closed is about 6.50 inches. Removable clips 24, 26 are each about 0.50 inches in width and about 1.62 inches in overall height. Inner welds 56, 58, 60 and outer welds 62, 64, 66 are electric fuse welds. Shield member 22 is about 1.62 inches in overall height. The material of clips 24, 26, 28, 30 is a spring steel, so that each clip can be sprung open for assembly to shield member 22.

The preferred embodiment is used with a frying pan and pan cover from about 7 inches to 12 inches. Cover 12 protects against splattering of hot frying fat, and the like. Cover 12 also minimizes cleaning of vessel 10 after frying food. Vessel 10 accommodates any fryable food product. Shield member 22 is easily positioned to raise lid 16 to increase the volume of chamber 23 for frying a relatively large volume of food product, such as chicken parts. Vessel 10 has a peripheral vent opening 21, which prevents unwanted steaming of a food product while under cover 12. Vessel 10 in the preferred embodiment is made from stainless steel material, for ease of cleaning by hand or by dishwasher.

The advantages of vessel 10 are indicated hereafter.

First, the vessel 10 is adjustable in volume for increasing or decreasing the volume of chamber 23, to suit the volume of the food to be cooked.

Second, the shield member 22 is expansible or adjustable in diameter to suit pans of different diameters, and to increase or decrease the volume of chamber 23.

Third, the shield member 22 and fixedly attached clips 24, 26, 28, 30 can be inverted or positioned to suit the desired volume of Chamber 23, and to increase or decrease the height of chamber 23.

Fourth, vessel 10 has a peripheral vent opening 21 to prevent excessive steaming of a food product.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A cooking vessel including a pan and a cover, said cover having a lid and a shield assembly with a peripheral space therebetween, said shield assembly comprising an expansible shield member which is supported by the pan, and a plurality of clip members which support the lid and which are supported by the expansible shield member, said expansible shield member having overlapping peripherally spaced end portions for adjusting the diameter of the shield member.

2. A shield assembly for supporting a lid of a pan comprising:
   an expansible shield member supported by the pan and having first and second overlapping end portions for adjusting the diameter thereof; and,
   a plurality of clip members for support by the shield member and for supporting the lid.

3. The assembly of claim 2 wherein
   said expansible shield member is a circular member; and
   said plurality of clip members include at least three clip members including at least one movable clip member and at least one retainer clip member;
   said movable clip member being movably connected to said expansible shield member for movement in a peripheral direction relative to the shield member; and
   said retainer clip being fixedly connected to a first end portion of the expansible shield member for holding a second end portion in an overlapping position.

4. The assembly of claim 3, wherein
   said expansible shield member has a lower edge portion and an upper edge portion; and wherein
   said movable clip member includes:
   a lower loop portion looped around said lower edge portion;
   an upper loop portion looped around said upper edge portion;
   a U-shaped portion fixedly connected to the lower loop portion at one end thereof and fixedly connected to the upper loop portion at the other end thereof; and
   an inner flange fixedly connected to the upper loop portion at one end thereof.

5. The assembly of claim 4, wherein
   said retainer clip includes:
   a lower loop portion looped around said lower edge portion;
   an upper loop portion looped around said upper edge portion;
   a U-shaped portion fixedly connected to the lower loop portion at one end thereof and fixedly connected to the upper loop portion at the other end thereof; and
   an inner flange fixedly connected to the upper loop portion at one end thereof, wherein
   one of said loop portions has a fixed connection to the first end portion of the expansible shield member for holding the second end portion in an overlapping position.

6. The assembly of claim 5 including:
   a second retainer clip of the same construction as said retainer clip including lower and upper loop portions, wherein
   one of the loop portions thereof has a fixed connection to the second end portion of the expansible shield member.

* * * * *